US008436522B2

(12) United States Patent
Cai et al.

(10) Patent No.: US 8,436,522 B2
(45) Date of Patent: May 7, 2013

(54) CARBON NANOTUBE SLURRY AND FIELD EMISSION DEVICE

(75) Inventors: Qi Cai, Beijing (CN); Xing Zhang, Beijing (CN); Hai-Yan Hao, Beijing (CN); Shou-Shan Fan, Beijing (CN)

(73) Assignees: Tsinghua University, Beijing (CH); Hon Hai Precision Industry Co., Ltd., New Taipei (TW)

( * ) Notice: Subject to any disclaimer, the term of this patent is extended or adjusted under 35 U.S.C. 154(b) by 258 days.

(21) Appl. No.: 12/904,678

(22) Filed: Oct. 14, 2010

(65) Prior Publication Data

US 2011/0241527 A1 Oct. 6, 2011

(30) Foreign Application Priority Data

Mar. 31, 2010 (CN) .......................... 2010 1 0137180

(51) Int. Cl.
*H01J 1/304* (2006.01)
*H01B 1/24* (2006.01)
*B82Y 30/00* (2011.01)

(52) U.S. Cl.
USPC ........................................... 313/311; 313/309

(58) Field of Classification Search .......... 313/495–497, 313/306, 309–311, 351, 346 R, 336, 292, 313/238; 445/24, 49–51
See application file for complete search history.

(56) References Cited

U.S. PATENT DOCUMENTS

| | | | | |
|---|---|---|---|---|
| 2005/0090176 | A1 * | 4/2005 | Dean et al. | 445/51 |
| 2005/0189860 | A1 | 9/2005 | Nam et al. | |
| 2008/0252195 | A1 | 10/2008 | Liu et al. | |
| 2009/0284122 | A1 | 11/2009 | Yang et al. | |

FOREIGN PATENT DOCUMENTS

| | | |
|---|---|---|
| CN | 1684216 | 10/2005 |
| CN | 101285960 | 10/2008 |
| WO | WO2009143094 | 11/2009 |

* cited by examiner

*Primary Examiner* — Anh Mai
*Assistant Examiner* — Elmito Breval
(74) *Attorney, Agent, or Firm* — Altis Law Group, Inc.

(57) ABSTRACT

A carbon nanotube slurry consists of carbon nanotubes, glass powder, and organic carrier. The field emission device includes an insulative substrate, a cathode conductive layer, and an electron emission layer. The cathode conductive layer is located on a surface of the insulative substrate. The electron emission layer is located on a surface of the cathode conductive layer. The electron emission layer consists of a glass layer and a plurality of carbon nanotubes electrically connected to the cathode conductive layer.

20 Claims, 6 Drawing Sheets

CARBON NANOTUBE SLURRY AND FIELD EMISSION DEVICE

CROSS-REFERENCE TO RELATED APPLICATIONS

This application claims all benefits accruing under 35 U.S.C. §119 from China Patent Application No. 201010137180.X, filed on Mar. 31, 2010 in the China Intellectual Property Office, disclosure of which is incorporated herein by reference.

BACKGROUND

1. Technical Field

The present disclosure relates to a carbon nanotube slurry and a field emission device.

2. Description of Related Art

Carbon nanotubes (CNT) are very small tube-shaped structures, and have extremely high electrical conductivity, very small diameters, and a tip-surface area near the theoretical limit. Thus, carbon nanotubes can transmit an extremely high electrical current and can be used to make a field emission device. The field emission device includes a cathode conductive layer and an electron emission layer thereon.

One method for making a field emission device based on carbon nanotubes is printing a carbon nanotube slurry on the cathode conductive layer to form the electron emission layer. However, the carbon nanotube slurry usually includes carbon nanotubes, indium tin oxide (ITO) particles, glass powder, and organic carrier. The size of the indium tin oxide particles is much smaller than the size of the glass powder, and the volume percentage of the indium tin oxide particles is much greater than the volume percentage of the glass powder. Therefore, some of the indium tin oxide particles tend to fall off from the electron emission layer under a strong electric field force and cause an abnormal luminescence. In addition, the indium tin oxide particles will weaken the adhesion between the carbon nanotubes and the glass powder. Thus, the carbon nanotubes tend to be pulled out from the electron emission layer by a strong electric field force causing the field emission device to have a short lifespan.

What is needed, therefore, is to provide a carbon nanotube slurry and a field emission device that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
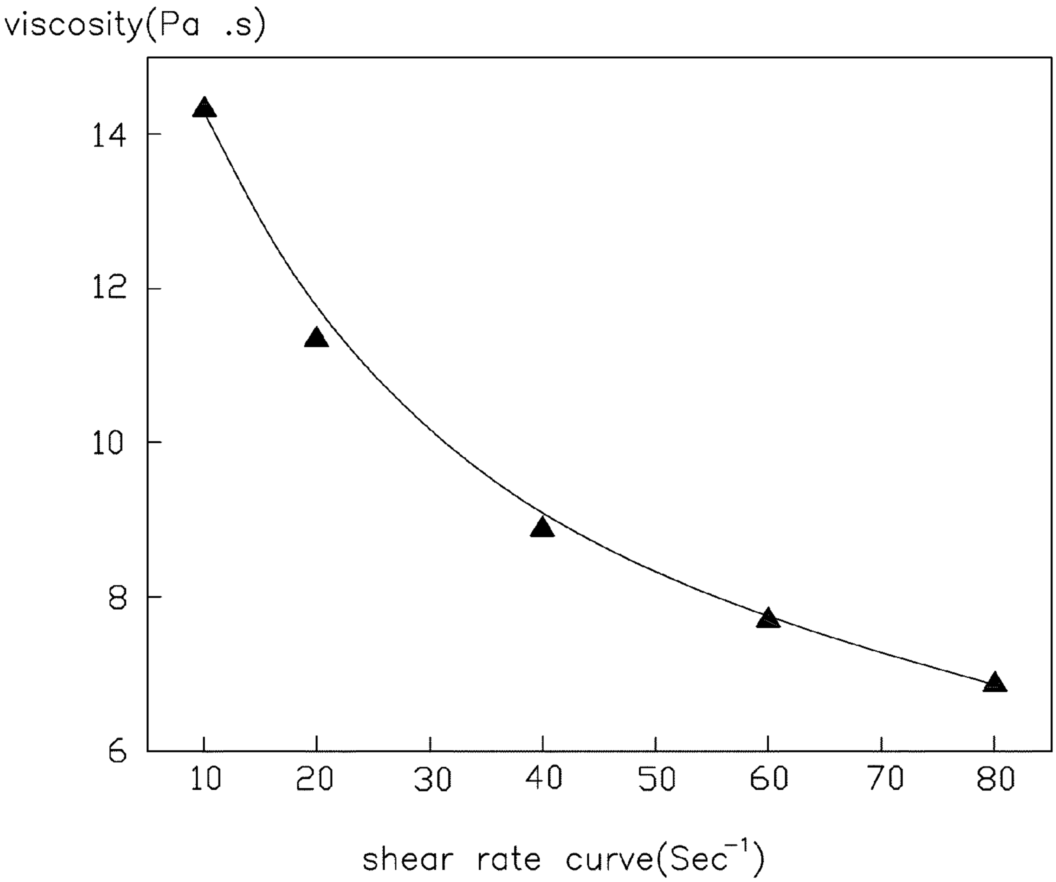
FIG. 1 is a viscosity vs. shear rate curve of a carbon nanotube slurry sample A of one embodiment.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present carbon nanotube slurry and field emission device.

A carbon nanotube slurry of one embodiment consists of carbon nanotubes, glass powder, and organic carrier. Namely, the carbon nanotube slurry is a mixture including carbon nanotubes, glass powder, and organic carrier, and does not include any indium tin oxide particles or other conductive particles, such as metal particles.

The weight percentage of the carbon nanotubes in the carbon nanotube slurry can range from about 2% to about 5%. The weight percentage of the glass powder in the carbon nanotube slurry can range from about 2% to about 5%. The weight percentage of the organic carrier in the carbon nanotube slurry can range from about 90% to about 96%. If the total weight percentage of the carbon nanotubes and glass powder in the carbon nanotube slurry is too high, the viscosity of the carbon nanotube slurry will be too high. The carbon nanotube slurry would adhere easily to the screen in a screen printing process and cause edges of a printed carbon nanotube slurry pattern to be irregular. If the total weight percentage of the carbon nanotubes and glass powder in the carbon nanotube slurry is too small, the carbon nanotube slurry will be less plastic. The carbon nanotube slurry would be difficult to mold in the screen printing process and a plurality of holes will be formed in the printed carbon nanotube slurry pattern. Controlling the weight percentage of the carbon nanotubes in a range from about 2% to about 5% and the weight percentage of the glass powder in a range from about 2% to about 5%, the carbon nanotube slurry can have proper viscosity and plasticity. Thus, the carbon nanotube slurry can meet the requirements of screen printing.

In one embodiment, the weight percentage of the carbon nanotubes in the carbon nanotube slurry can range from about 2.5% to about 3%. The weight percentage of the glass powder in the carbon nanotube slurry can range from about 2.5% to about 3%. The weight percentage of the organic carrier in the carbon nanotube slurry can range from about 94% to about 95%.

The carbon nanotubes can be single-walled carbon nanotubes, double-walled carbon nanotubes, multi-walled carbon nanotubes, and combinations thereof. The diameter of each single-walled carbon nanotube can range from about 0.5 nanometers to about 50 nanometers. The diameter of each double-walled carbon nanotube can range from about 1 nanometer to about 50 nanometers. The diameter of each multi-walled carbon nanotube can range from about 1.5 nanometers to about 50 nanometers. The length of the carbon nanotubes can be larger than 1 micrometer. In one embodiment, the length of the carbon nanotubes is in a range from about 5 micrometers to about 15 micrometers.

The glass powder is a low melting point glass powder with a melting point in a range from about 350° C. to about 600° C.

The effective diameter of the glass powder can be less than or equal to 10 micrometers. In one embodiment, the effective diameter of the glass powder is less than or equal to 1 micrometer.

The organic carrier is a volatilizable organic material and can be removed by heating. The organic carrier can include a diluent, stabilizer, and plasticizer. The diluent can dissolve the stabilizer and allows the carbon nanotube slurry to have liquidity. The diluent can be terpineol. The stabilizer has strong polarity and can combine with the plasticizer to form a network structure or chain structure to enhance the viscosity and plasticity of the carbon nanotube slurry. The stabilizer can be a polymer such as ethyl cellulose. The plasticizer is solvent with a molecular chain having strong polarized groups, and can combine with the stabilizer to form a network structure. The plasticizer can be dibutyl phthalate or dibutyl sebacate. In one embodiment, the plasticizer is dibutyl sebacate with a boiling point of about 344° C. The dibutyl sebacate is very volatilizable and inexpensive. The dibutyl sebacate does not contain a benzene ring and is environmentally safe. Furthermore, the organic carrier can include surfactant, such as Span 40 with a formula of $C_6H_8O(OH)_3OCO(CH_2)_{14}CH_3$ $C_{22}H_{42}O_6$ or Span 60 with a formula of $C_6H_8O(OH)_3OCO(CH_2)_{16}CH_3$ $C_{24}H_{46}O_6$.

In one embodiment, the carbon nanotubes are multi-walled carbon nanotubes with a diameter less than or equal to 10 nanometers and a length in a range from about 5 micrometers to about 15 micrometers. The glass powder is a low melting point glass powder with an effective diameter less than or equal to 10 micrometers. The organic carrier includes terpineol, ethyl cellulose, dibutyl sebacate and Span. The weight ratio of the terpineol, ethyl cellulose, dibutyl sebacate, and Span is 180:11:10:2. In one embodiment, four carbon nanotube slurry samples are provided as shown in the following Table 1.

TABLE 1

Four Carbon nanotube slurry Samples

| Sample Number | Carbon Nanotubes (g) | Low Melting Point Glass Powder (g) | Organic Carrier (g) |
|---|---|---|---|
| A | 0.3 | 0.3 | 10 |
| B | 0.3 | 0.4 | 10 |
| C | 0.3 | 0.5 | 10 |
| D | 0.4 | 0.4 | 10 |

The viscosities of the four carbon nanotube slurry samples are tested. The viscosity of the carbon nanotube slurry is in a range from about 13 Pa·s to about 16 Pa·s at a shear rate of about 10 second$^{-1}$. FIG. 1 shows a viscosity vs. shear rate curve of the carbon nanotube slurry sample A. As shown in FIG. 1, the viscosity of the carbon nanotube slurry sample A decreases as the shear rate increases. Therefore, the carbon nanotube slurry is a pseudo plastic fluid and very suitable for printing requirements.

Furthermore, the field emission performances of the four carbon nanotube slurry samples are tested. The testing conditions are shown in Table 2.

TABLE 2

Field Emission Performances Testing Conditions

| Testing Parameters | Structure or Value |
|---|---|
| Testing Type | Diode type |
| Anode | Indium Tin Oxide Glass |

TABLE 2-continued

Field Emission Performances Testing Conditions

| Testing Parameters | Structure or Value |
|---|---|
| Cathode | Carbon nanotube slurry printed on a Silver Layer |
| Distance between Anode and Cathode | 1 mm |
| Anode Pulse Frequency | 100 Hz |
| Anode Pulse Width | 10 μs |

In the testing process, a non-inductance resistor with a resistance of about 50 ohms is connected to the cathode in series. An oscilloscope is used to test the voltage across the resistor. The field emission current of the four carbon nanotube slurry samples are calculated and shown in table 3.

TABLE 3

Field Emission Performances Testing Results

| Sample Number | Field Emission Current (Anode Voltage 2.0 kV) | Field Emission Current (Anode Voltage 2.5 kV) | Field Emission Current (Anode Voltage 3.0 kV) |
|---|---|---|---|
| A | 8 mA | 40 mA | 153.6 mA |
| B | 12 mA | 48 mA | 200 mA |
| C | 6 mA | 28 mA | 120 mA |
| D | 2.4 mA | 33.6 mA | 169.6 mA |

Figure 2:
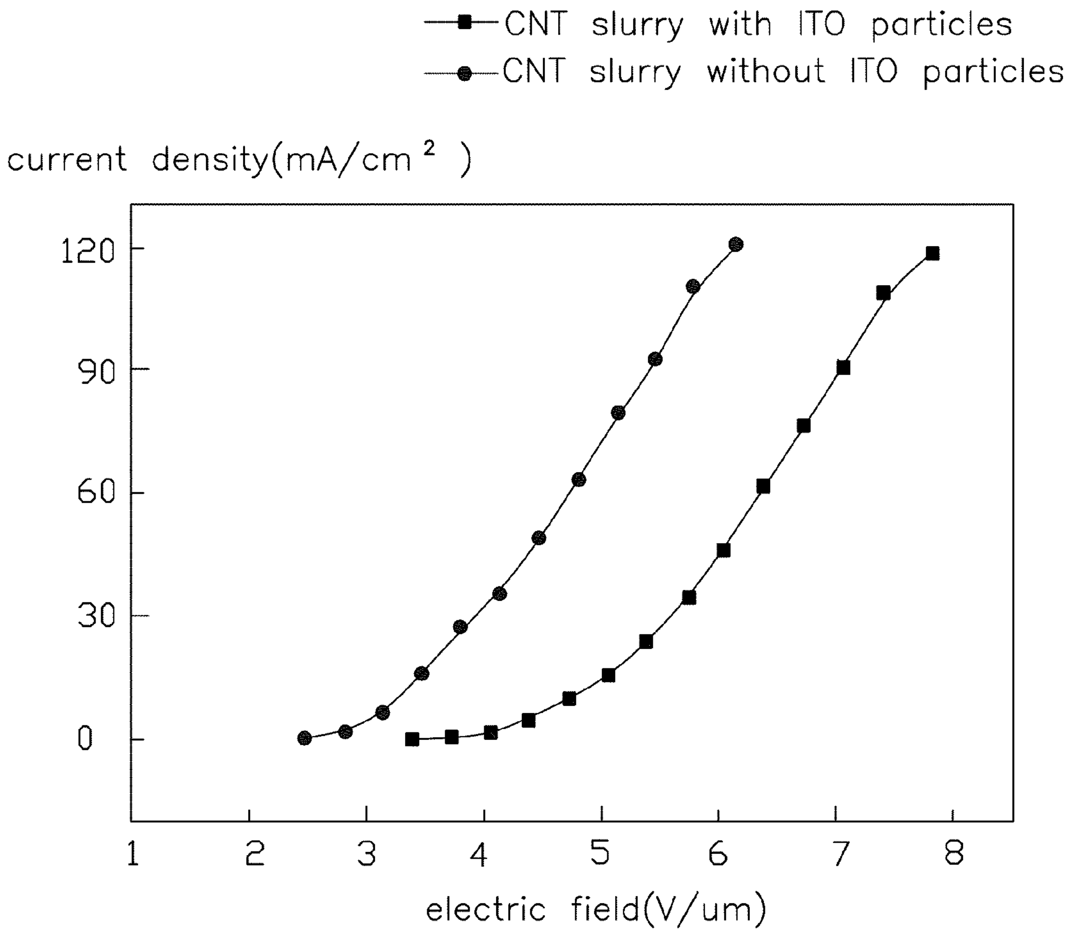
FIG. 2 shows a current density vs. electric field curve of a carbon nanotube slurry with indium tin oxide particles of related art and a current density vs. electric field curve of a carbon nanotube slurry without indium tin oxide particles of one embodiment.

The field emission performances of the carbon nanotube slurry sample B without indium tin oxide particles and field emission performances of the carbon nanotube slurry with indium tin oxide particles are compared. The carbon nanotube slurry with indium tin oxide particles consists of carbon nanotubes, indium tin oxide particles, low melting point glass powder, and organic carrier with a weight ratio of 1:2:1:20. As shown in FIG. 2, the field emission current density of the carbon nanotube slurry sample B is greater than the field emission current density of the carbon nanotube slurry with indium tin oxide particles. That is, the field emission performances of the carbon nanotube slurry is not reduced, but enhanced after the indium tin oxide particles are removed.

Figure 3:
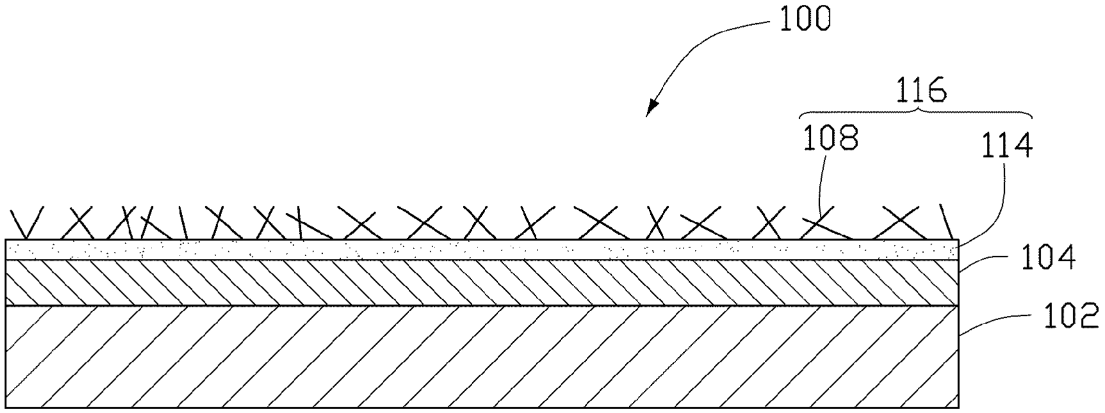
FIG. 3 shows one embodiment of a field emission device.

Referring to FIG. 3, a field emission device 100 of one embodiment includes an insulative substrate 102, a cathode conductive layer 104, and an electron emission layer 116. The cathode conductive layer 104 is positioned on a surface of the insulative substrate 102. The electron emission layer 116 is positioned on a surface of the cathode conductive layer 104. The electron emission layer 116 is made from the carbon nanotube slurry provided above.

The insulative substrate 102 can be made of insulative material. The insulative material can be ceramics, glass, resins, quartz, or polymer. A size, a shape, and a thickness of the insulative substrate 102 can be chosen according to need. In one embodiment, the insulative substrate 102 is a square glass plate with a thickness of about 1 millimeter and an edge length of about 50 millimeters.

The cathode conductive layer 104 can be a metal layer, an indium tin oxide layer, a conductive slurry layer, or a doped silicon layer. The metal can be copper, aluminum, gold, or silver. The conductive slurry can include from about 50% to about 90% (by weight) of the metal powder, from about 2% to about 10% (by weight) of the glass powder, and from about 8% to about 40% (by weight) of the binder. The thickness of the cathode conductive layer 104 can range from about 50 micrometers to about 500 micrometers. In one embodiment, the cathode conductive layer 104 is an aluminum film with a thickness of about 100 micrometers.

The electron emission layer 116 consists of a glass layer 114 and a plurality of carbon nanotubes 108. The carbon nanotubes 108 are electrically connected to the cathode conductive layer 104. The glass layer 114 is formed by melting the glass powder of the carbon nanotube slurry. The glass layer 114 is configured to fix the carbon nanotubes 108 on the surface of the cathode conductive layer 104. A plurality of ends of the carbon nanotubes 108 is exposed from the glass layer 114 and configured to emit electrons.

Figure 4:
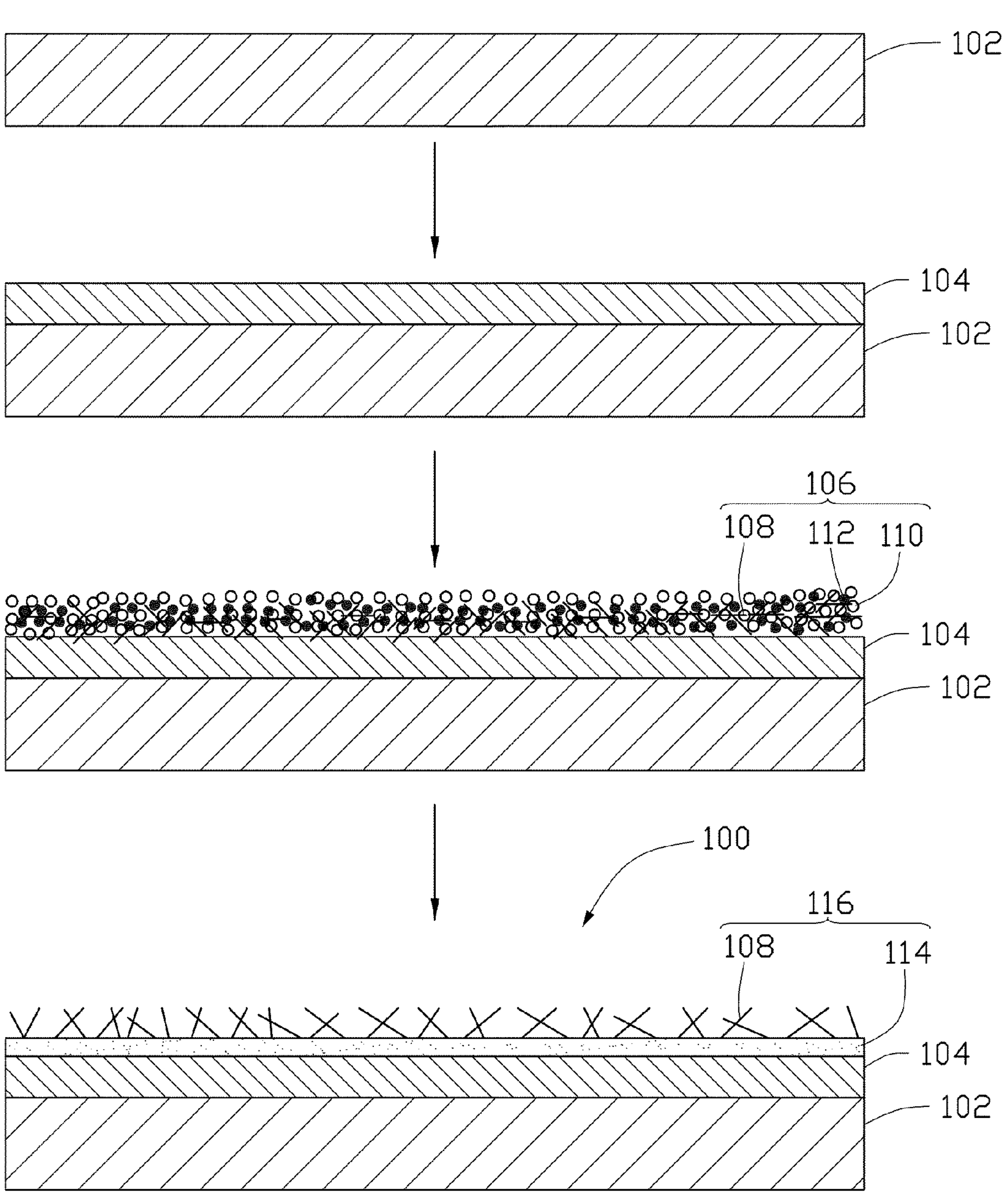
FIG. 4 shows a process of one embodiment of a method for making a field emission device.

Referring to FIG. 4, a method for making the field emission device 100 of one embodiment includes the following steps of:

step (a) providing an insulative substrate 102;

step (b) forming a cathode conductive layer 104 on a surface of the insulative substrate 102;

step (c) applying a carbon nanotube slurry layer 106 on a surface of the cathode conductive layer 104;

step (d) heating the carbon nanotube slurry layer 106 in a temperature range of about 300° C. to about 600° C. to form an electron emission layer 116.

In step (a), the insulative substrate 102 is a square glass plate with a thickness of about 1 millimeter and an edge length of about 50 millimeters.

In step (b), the cathode conductive layer 104 can be made by a method of screen printing, electroplating, chemical vapor deposition, magnetron sputtering, heat deposition, or directly fixing a metal sheet. In one embodiment, the cathode conductive layer 104 is an aluminum film made by magnetron sputtering.

In step (c), the carbon nanotube slurry layer 106 can be formed by spraying, spin-coating, screen printing, or brushing. The carbon nanotube slurry layer 106 includes carbon nanotubes 108, glass powder 112, and organic carrier 110. In one embodiment, the carbon nanotube slurry layer 106 is formed by screen printing.

In step (d), the carbon nanotube slurry layer 106 is heated in a vacuum or in a protection gas with the insulative substrate 102 and the cathode conductive layer 104. The protection gas can be nitrogen gas or an inert gas, such as argon gas. The step (d) includes the substeps of:

step (d1) drying the carbon nanotube slurry layer 106 in a temperature of about 300° C. to about 400° C.;

step (d2) baking the carbon nanotube slurry layer 106 in a temperature of about 400° C. to about 600° C.

step (d3) cooling the carbon nanotube slurry layer 106 to form the electron emission layer 116.

In step (d1), the organic carrier 110 is volatilized. In one embodiment, the carbon nanotube slurry layer 106 is kept in a vacuum at about 350° C. for about 20 minutes.

In step (d2), the glass powder 112 is melted. In one embodiment, the carbon nanotube slurry layer 106 is kept in a vacuum at about 430° C. for about 30 minutes.

In step (d3), the melted glass powder concretes and forms a glass layer 114 to fix the carbon nanotubes 108 on the cathode conductive layer 104.

Furthermore, an optional step (e) of surface treating can be performed after step (d). The method of surface treating can be surface polishing, plasma etching, laser etching, or adhesive tape peeling. In one embodiment, the surface of the electron emission layer 116 is treated by adhesive tape to peel part of the carbon nanotubes 108 which are not firmly attached on the electron emission layer 116. The remaining carbon nanotubes 108 are firmly attached on the electron emission layer 116, substantially vertical and dispersed uniformly. Therefore, interference from the electric fields between the carbon nanotubes 108 is reduced and the field emission performances of the electron emission layer 116 are enhanced.

Figure 5:
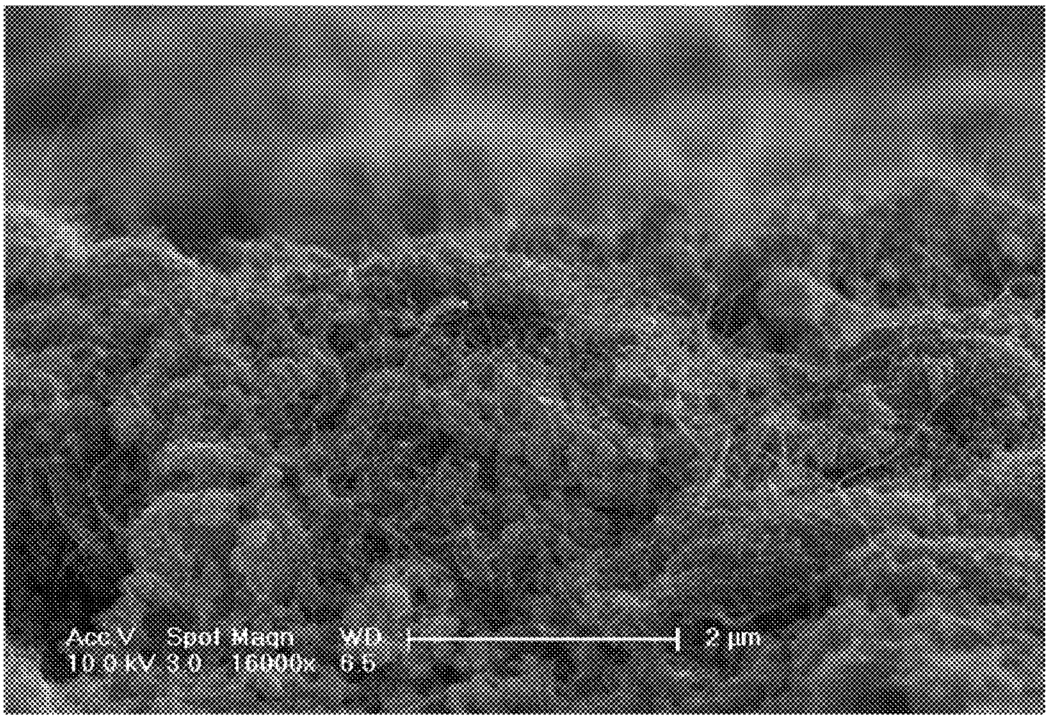
FIG. 5 is a Scanning Electron Microscope (SEM) image of an electron emission layer with indium tin oxide particles of related art.
Figure 6:
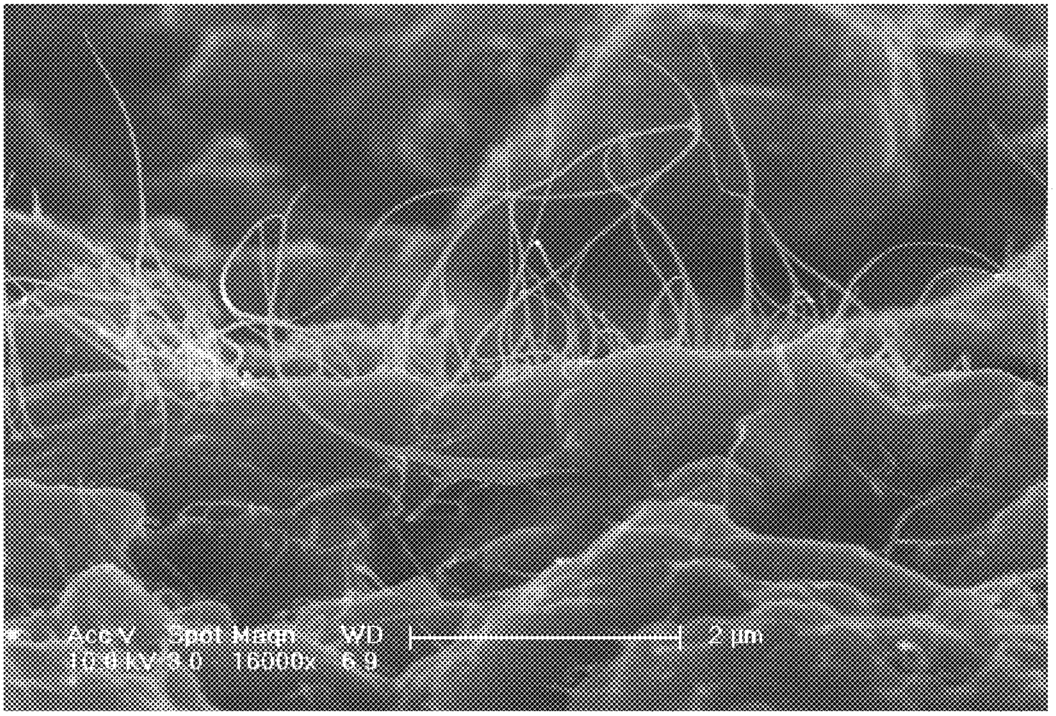
FIG. 6 is an SEM image of an electron emission layer without indium tin oxide particles of one embodiment.

FIG. 5 shows a SEM image of an electron emission layer with indium tin oxide particles made from the carbon nanotube slurry with indium tin oxide particles. FIG. 6 shows a SEM image of the electron emission layer 116 without indium tin oxide particles. Because the electron emission layer 116 of FIG. 6 does not include indium tin oxide particles, the carbon nanotubes and the glass layer can tightly combine with each other. Therefore, the carbon nanotubes are not easily pulled out from the electron emission layer by a strong electric field force. In addition, more ends of the carbon nanotubes can be exposed from the glass layer of the electron emission layer 116 without indium tin oxide particles.

In a related case, the indium tin oxide particles are configured to enhance the conductivity of the carbon nanotube slurry so that the electron emission layer can have a low work voltage. However, after removing the indium tin oxide particles, it was discovered that the work voltage of the electron emission layer does not increase, but decreases. After removing the indium tin oxide particles, the electric field caused by the indium tin oxide particles disappears and the electric field distribution on the surface of electron emission layer is changed. The work voltage decrease may be a result from the change of the electric field distribution on the surface of electron emission layer.

The field emission device having an electron emission layer without indium tin oxide particles has the following advantages. First, when the field emission device is applied to field emission display, there will not be indium tin oxide particles falling off from the electron emission layer on a gate electrode. Thus, abnormal luminescence can be avoided. Second, the carbon nanotubes and the glass layer can combine with each other tightly. The carbon nanotubes are not easily pulled out from the electron emission layer by a strong electric field force. Therefore, the field emission device has a long lifespan. Third, more ends of the carbon nanotubes can be exposed from the glass layer. Thus, the field emission performances of the electron emission layer 116 are enhanced. Finally, the field emission device without indium tin oxide particles has low cost.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A carbon nanotube slurry consisting of carbon nanotubes, glass powder, and organic carrier, wherein a weight percentage of the carbon nanotubes ranges from about 2% to about 5%, a weight percentage of the glass powder ranges from about 2% to about 5%, a weight percentage of the organic carrier ranges from about 90% to about 96%, and a viscosity of the carbon nanotube slurry ranges from about 13 Pa·s to about 16 Pa·s at a shear rate of about 10 $second^{-1}$.

2. The carbon nanotube slurry of claim 1, wherein the weight percentage of the carbon nanotubes ranges from about 2.5% to about 3%, the weight percentage of the glass powder ranges from about 2.5% to about 3%, and the weight percentage of the organic carrier ranges from about 94% to about 95%.

3. The carbon nanotube slurry of claim 1, wherein the carbon nanotubes are selected from the group consisting of single-walled carbon nanotubes, double-walled carbon nanotubes, multi-walled carbon nanotubes, and combinations thereof.

4. The carbon nanotube slurry of claim 1, wherein a diameter of each of the carbon nanotubes ranges from about 0.5 nanometers to about 50 nanometers, and a length of each of the carbon nanotubes is larger than 1 micrometer.

5. The carbon nanotube slurry of claim 4, wherein the diameter of each of the carbon nanotubes is less than or equal to 10 nanometers, and a length of each of the carbon nanotubes ranges from about 5 micrometers to about 15 micrometers.

6. The carbon nanotube slurry of claim 1, wherein the glass powder is a low melting point glass powder with a melting point in a range from about 350° C. to about 600° C.

7. The carbon nanotube slurry of claim 1, wherein an effective diameter of the glass powder is less than or equal to 10 micrometers.

8. The carbon nanotube slurry of claim 7, wherein the effective diameter of the glass powder is less than or equal to 1 micrometer.

9. The carbon nanotube slurry of claim 1, wherein the organic carrier is a volatilizable organic material and comprises a diluent, stabilizer, and plasticizer.

10. The carbon nanotube slurry of claim 1, wherein the organic carrier comprises terpineol, ethyl cellulose, and dibutyl phthalate.

11. The carbon nanotube slurry of claim 1, wherein the organic carrier comprises terpineol, ethyl cellulose, and dibutyl sebacate.

12. The carbon nanotube slurry of claim 11, wherein the organic carrier further comprises a surfactant; a weight ratio of the terpineol, ethyl cellulose, dibutyl sebacate and surfactant is about 180:11:10:2.

13. The carbon nanotube slurry of claim 12, wherein the surfactant is Span 40 with a formula of $C_6H_8O(OH)_3OCO(CH_2)_{14}CH_3$ $C_{22}H^{42}O_6$.

14. The carbon nanotube slurry of claim 12, wherein the surfactant is Span 60 with a formula of $C_6H_8O(OH)_3OCO(CH_2)_{16}CH_3$ $C_{24}H_{46}O_6$.

15. A field emission device, comprising:

an insulative substrate;

a cathode conductive layer positioned on a surface of the insulative substrate; and an electron emission layer located on a surface of the cathode conductive layer, and a layer consisting of low melting point glass and a plurality of carbon nanotubes electrically connected to the cathode conductive layer.

16. The field emission device of claim 15, wherein the plurality of carbon nanotubes is fixed on the cathode conductive layer by the glass layer.

17. The field emission device of claim 15, wherein a plurality of ends of the plurality of carbon nanotubes is exposed from the glass layer.

18. A carbon nanotube slurry being a mixture comprising a plurality of carbon nanotubes, a plurality of glass powders, and an organic carrier, wherein the organic carrier comprises a diluent, a stabilizer, and a plasticizer being selected from the group consisting of dibutyl phthalate and dibutyl sebacate.

19. The carbon nanotube slurry of claim 18, wherein the diluent is terpineol, the stabilizer is ethyl cellulose, and the plasticizer is dibutyl sebacate.

20. The carbon nanotube slurry of claim 19, wherein a weight ratio of the terpineol, ethyl cellulose, and dibutyl sebacate is about 180:11:10.

* * * * *